United States Patent [19]
Koons, Jr.

[11] Patent Number: 5,819,996
[45] Date of Patent: Oct. 13, 1998

[54] TRUNK ORGANIZER

[76] Inventor: Robert Patrick Koons, Jr., 12 Louise Rd., RD3, Wyoming, Pa. 18644

[21] Appl. No.: 902,321

[22] Filed: Jul. 29, 1997

[51] Int. Cl.[6] ...................................................... B60R 7/02
[52] U.S. Cl. ........................ 224/42.34; 224/542; 224/925; 220/8
[58] Field of Search .............................. 224/42.34, 42.33, 224/542, 925; 211/195, 201, 12, 175, 184, 71.01, 85.15; 220/8, 534; 206/335, 373; 410/121

[56] References Cited

U.S. PATENT DOCUMENTS

| | | | |
|---|---|---|---|
| 5,031,769 | 7/1991 | Shea et al. ................................ | 220/8 |
| 5,083,827 | 1/1992 | Hollenbaugh, Sr. ..................... | 224/542 |
| 5,161,700 | 11/1992 | Stannis et al. .......................... | 224/925 |

*Primary Examiner*—Linda J. Sholl
*Attorney, Agent, or Firm*—Patent & Trademark Services; Joseph H. McGlynn

[57] ABSTRACT

An improved organizer for the storage space of a vehicle, comprising exterior and interior wall members defining a plurality of storage area subdivisions. Slidable dividers are mounted in hollow wall members. The dividers may be opened and closed to achieve the desired organizational configuration. Holes are provided along the top edges of the exterior wall members for the attachment of covers or straps, to enhance security and organization of items. Gripping members are provided along the bottom edges of the exterior walls to prevent unwanted movement of the organizer in the storage space.

8 Claims, 1 Drawing Sheet

TRUNK ORGANIZER

BACKGROUND OF THE INVENTION

The present invention relates generally to accessories for organizing articles in an automobile, and in particular to a structure, for use in a trunk area, having a plurality of fixed and movable dividers.

DESCRIPTION OF THE PRIOR ART

A frequently encountered problem in transporting articles in an automobile is that the articles tend to move and slide with the motion of the car, thereby becoming damaged and disorganized. This is especially true of small objects, which tend to get misplaced or mixed in with other items. A number of inventions have been disclosed in the prior art in an attempt to solve these problems.

For example, U.S. Pat. No. 4,029,244 describes a collapsible stand which forms compartments for transporting grocery bags.

U.S. Pat. No. 4,718,584 discloses an accessory for dividing storage space, comprising a base, a swingably attached back flap, and two swingably attached side flaps.

U.S. Pat. No. 5,215,205 describes a structure formed from a plurality of disconnectable wall members, having also a plurality of disconnectable dividers defining variously sized storage compartments.

U.S. Pat. No. 5,419,471 describes a collapsible structure formed from a planar piece of bendable material with fold lines.

The prior art inventions, however, are relatively complicated to assemble and to use. Moreover, they do not provide for quick and easy reconfiguration of the storage compartments. There remains a need for an organizer with readily movable storage compartments, to provide for rapid and convenient changes in the organizational scheme of the vehicle's storage area. The present invention represents an improvement over the prior art in that it provides for the rapid and convenient reconfiguration of the storage area, as well as a number of other advantages not provided by previous inventions.

SUMMARY OF THE INVENTION

The present invention is a storage and organizational structure, primarily but not exclusively for use in the trunk or hatchback of an automobile. The invention comprises a plurality of exterior and interior wall members defining storage areas, and a series of movable dividers contained therein. The dividers are slidably mounted within the hollow perimeter walls of the organizer so that they may be pushed inside the perimeter wall or pulled therefrom, depending on the desired organizational scheme. When the dividers are pushed inside the perimeter wall, the organizer of the present invention leaves a portion of the trunk space undivided, which is useful for the storage of large items. The dividers may be pulled out to subdivide as much or as little of the storage area are as desired.

In addition, the present invention provides for greater stability in the storage of items by means of gripping members on the bottom of the structure, which prevents the structure from shifting with the movement of the vehicle. A further advantage is provided by openings in the top edges of the structure, which allow for the attachment of covers or "bungee" cords to ensure the security of stored items and to further subdivide the storage compartment.

Accordingly, it is an object of this invention to provide an improved storage space organizer.

It is a further object of this invention to provide an improved storage space organizer which can be readily adjusted to change the organizational configuration of a storage space.

It is a further object of this invention to provide an improved storage space organizer with slidable dividers.

It is still further an object of this invention to provide an improved storage space organizer which ensures the security of stored items by preventing unwanted movement of the items.

These and other objects and advantages of the present invention will become apparent from the detailed description below, when taken in connection with the annexed drawings.

DESCRIPTION OF THE PREFERRED EMBODIMENT

Figure 1:
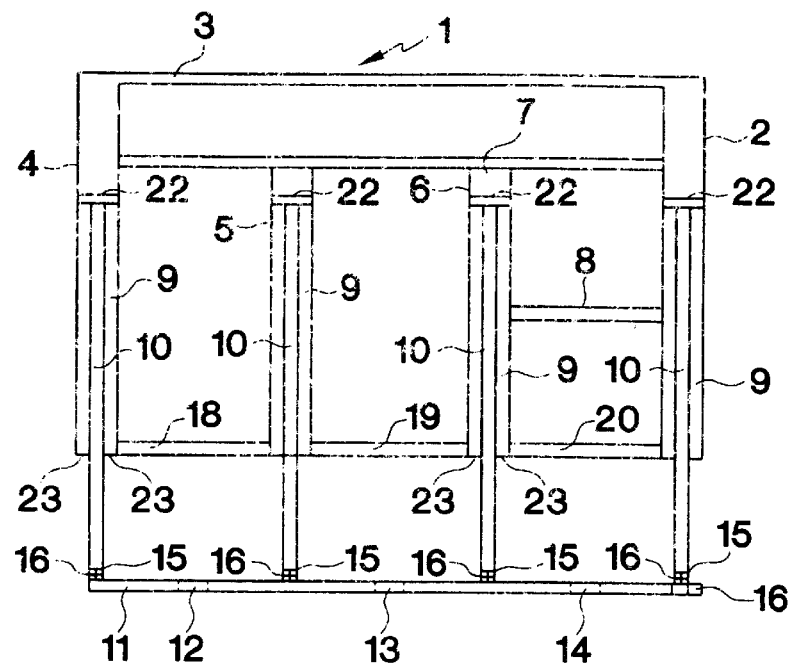
FIG. 1 shows a top view of the present invention with the storage dividers in the partially open position.

Referring now to the drawings in greater detail, it can be seen in FIG. 1 that the present invention 1 comprises planar wall members 2, 3, 4 connected at their ends to form a rectilinear perimeter wall structure. Each of the planar wall members 2, 3, 4 have a hollow portion 9 into which the walls 10 of the movable dividers slide. It can be seen further in FIG. 1 that the area thus enclosed is further subdivided by interior wall members 5, 6, 7, 8. The wall members 5, 6 are hollow while the wall members 7, 8 are solid. An elongated back storage area is formed by wall members 2, 3, 4, and 7, and wall members 5, 6, and 8 which create subdivisions in the remaining area defined by wall members 2, 4, and 7. The organizer will have front walls 18, 19, 20 to close the front of the organizer.

The wall members 2–8 may be constructed from durable hard plastic, plywood, or any suitable material, and may be connected by any suitable means including, but not limited to, screws and nails. The invention 1 may be of various dimensions to fit the trunk or storage area of a variety of automobiles.

As shown in FIG. 1, the invention 1 further comprises storage dividers 10 which are attached to a front member 11. The dividers 10 are slidably mounted within the hollow portions 10 of the walls 2, 4, 5, and 6. Handles 12, 13, 14 are provided on the front face 11 of the dividers for opening and closing. The handles can be any conventional structure such as knobs or holes in the face portion 11 which will assist a user in pulling the dividers out or pushing them in. There will not be a floor on the bottom of the dividers, since the floor of the trunk will serve the purpose of a floor to hold the items placed into the organizer.

Figure 2:
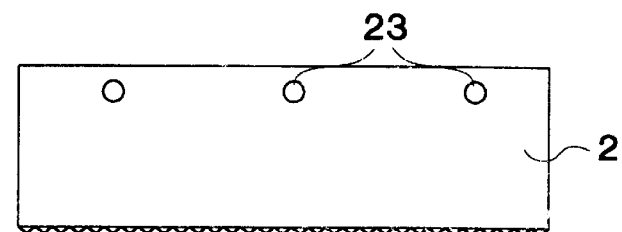
FIG. 2 shows a side view of the present invention.

FIG. 2 depicts a side view of the organizer showing one of the outside walls 2. Each of the outside walls 2, 3, 4 have a plurality of holes 23 disposed along the top edge of the exterior wall members 2, 3, 4. These holes can be used to fasten covers or elastic straps ("bungee cords") to further ensure the security of the stored articles. The holes may also be used to attach ropes or straps to further subdivide the storage area for more detailed organization.

Also shown in FIG. 2 are rubber spikes 24 disposed along the bottom edge of the exterior wall members 2, 3, 4. These spikes 24 provide traction to prevent the organizer of the present invention 1 from sliding about in the car's storage area. Other devices to provide traction may, of course, be used without departing from the scope of the invention. For example, rubber strips or suction cups may also be attached. For storage areas having carpeting, velcro strips could be employed.

As shown in FIG. 1, stop blocks 22 are provided on the back of each of the dividers 10 and complimentary blocks 23 are provided at the front of the hollow portions 9 to prevent the dividers from sliding out of the perimeter structure. When the dividers 10 are pulled out, the stop blocks 22 come into contact with the blocks 23 and prevent further travel of the dividers 10. Also, it should be noted that the dividers shown in FIG. 1 are shown as a single divider, however, the dividers could all be separate elements so that the dividers could be pulled out of the main organizer one at a time as needed.

Figure 3:
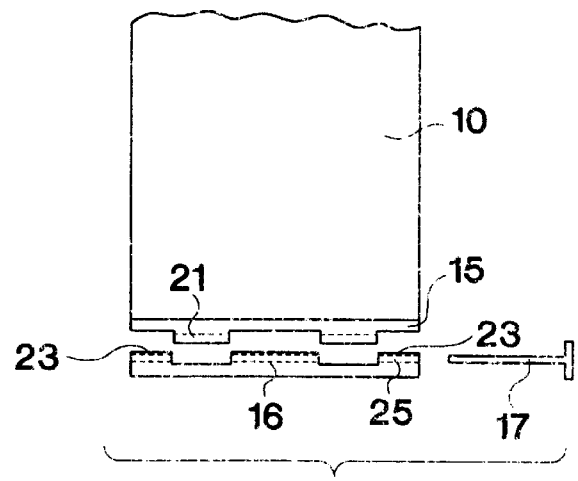
FIG. 3 shows a fragmentary view of one of the dividers of the present invention with a latch to hold the dividers closed.

FIG. 3 shows a latch that can be used to hold the dividers closed. The latch has two parts 15, 16, one of which is attached to the divider and the other is attached to the front face 11 as shown in FIG. 3. The two parts of the latch have fingers 23 and apertures 21. The fingers 23 will interleave when the divider is in the closed position, much like the hinges on a door. When the fingers 23 are interleaved, the apertures 21 in each finger will align, and a pin 17 can be passed through the aligned apertures to hold the dividers in the closed position.

In use, the invention 1 provides a means to organize and store items in a wide variety of configurations. The dividers 10 may be placed in the fully closed, fully open, or partially closed position to subdivide as large or as small an area of the storage space as desired. As noted above, cords or ropes my be attached between the holes of the perimeter walls to further subdivide and organize the storage area or to hold items within the organizer. The invention thus provides a degree of convenience and flexibility not heretofore provided by the prior art organizers.

Although the storage space organizer and the method of using the same according to the present invention has been described in the foregoing specification with considerable details, it is to be understood that modifications may be made to the present invention which do not exceed the scope of the appended claims and modified forms of this invention done by others skilled in the art to which the invention pertains will be considered infringements of this invention when those modified forms fall within the claimed scope of the invention.

What I claim as my invention is:

1. An organizer for storing a variety of items in a vehicle trunk wherein said organizer comprises:

a base container comprising a bottom, a front wall, a back wall, two sides, and an open top, said base container having at least one divider wall extending between said front and back wall, said sides and said at least one divider wall being hollow and having openings adjacent said front wall, dividers extending into said hollow sides and divider wall, said dividers are movable from a fully closed position to a fully open position, whereby said dividers can be moved to provide an adjustable storage area.

2. The organizer for storing a variety of items in a vehicle trunk as claimed in claim 1, wherein there is a plurality of divider walls and a plurality of adjustable dividers.

3. The organizer for storing a variety of items in a vehicle trunk as claimed in claim 1, wherein at least said sides and said back wall have means attached thereto for securing a holding means for holding items within said base container.

4. The organizer for storing a variety of items in a vehicle trunk as claimed in claim 1, wherein at least a portion of said bottom has a non-slip surface applied thereto.

5. The organizer for storing a variety of items in a vehicle trunk as claimed in claim 1, wherein said base container has at least one additional divider wall extending between said sides and spaced from said back wall.

6. The organizer for storing a variety of items in a vehicle trunk as claimed in claim 1, wherein said adjustable dividers have a stop attached adjacent a back of said dividers, and said front wall has a complimentary stop attached thereto, whereby said stops cooperate to prevent said adjustable dividers from becoming detached from said base container.

7. The organizer for storing a variety of items in a vehicle trunk as claimed in claim 1, wherein said dividers have latch means for holding said dividers in a closed position.

8. The organizer for storing a variety of items in a vehicle trunk as claimed in claim 7, wherein said latch means comprises a first latch member on said front wall and a second latch member on said dividers, each of said latch members have protrusions, each of said protrusions have apertures extending therethrough, said protrusions on said first and second latch members are interleaved when said dividers are in the closed position, said apertures in said protrusions are aligned when said dividers are in the closed position, and a pin extending through said aligned apertures to hold said first and second latch members together.

* * * * *